Dec. 21, 1937.  V. F. TAYLOR  2,102,764
ILLUMINATING DEVICE
Filed July 29, 1936

Inventor:
Vernon F. Taylor,
by John Howard Joynt.
his Attorney.

Patented Dec. 21, 1937

2,102,764

UNITED STATES PATENT OFFICE 2,102,764

ILLUMINATING DEVICE

Vernon F. Taylor, San Antonio, Tex.

Application July 29, 1936, Serial No. 93,281

1 Claim. (Cl. 240—7.1)

My invention relates to automotive vehicles and more particularly to the lights carried by such vehicles that are employed in illuminating the course of vehicular travel.

One of the objects of my invention is the provision of simple, economical and efficient means of advising an observer of the exact position of the body of a vehicle approaching in the dark even though one of the two road lights ordinarily carried by the vehicle is extinguished.

Another object is the provision of a means which is simple and inexpensive in construction and which readily lends itself to installation and use in known and available automobile headlights with a minimum of change or alteration in the headlight construction.

Another object of my invention is the production and utilization of an improved headlight lens of compact, inexpensive and thoroughly reliable construction particularly designed to throw a beam of white light in desired pattern and an associated beam of colored light of such size, configuration and juxtaposition as to effectively illuminate a desired field and at the same time afford a reliable signal or indication observable at a desired range and within a given field.

Other objects in part will be obvious and in part pointed out hereinafter.

The invention accordingly consists in the combination of elements, features of construction and arrangement of parts as described herein and the scope of the application of which is indicated in the following claim.

Figure 1:
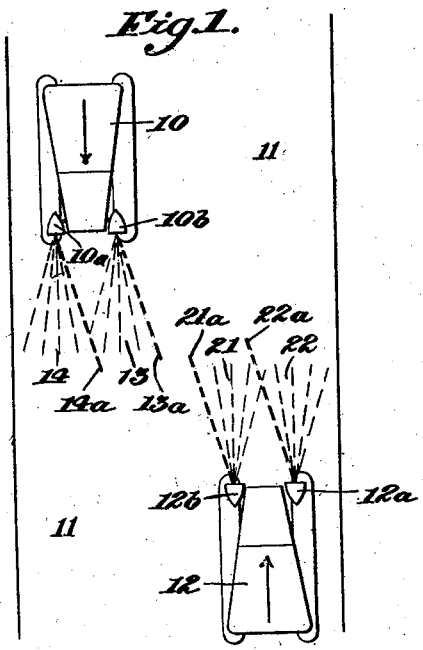
Figure 2:
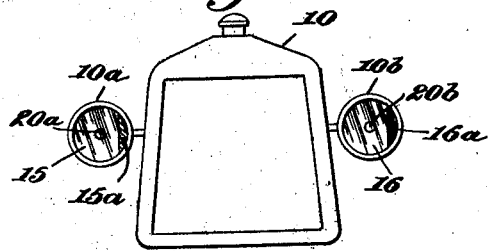
Figure 3:
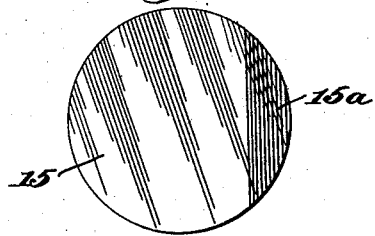
Figure 4:
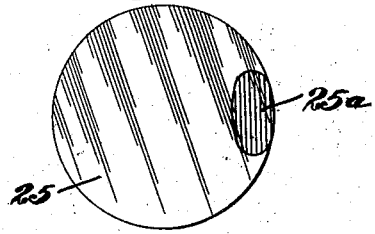
Figure 5:
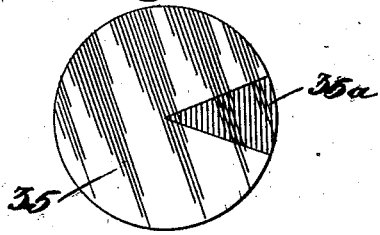
Figure 6:
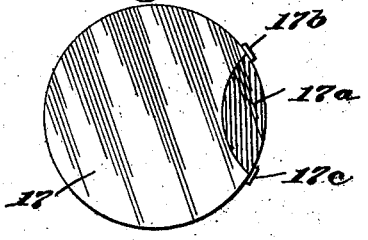

In the accompanying drawing Figure 1 represents a plan view of an automotive vehicle bearing an illuminating and indicating device including certain features of my invention, Figure 2 is a detached front elevation view, on an enlarged scale, of the vehicle and illuminating device shown in Figure 1, Figures 3, 4 and 5 represent vehicle headlight lenses or glasses constructed according to the provisions of my invention, and Figure 6 represents a modified form of my invention as applied to known vehicle headlight lenses or glasses.

As conducive to a clearer understanding of certain features of my invention, it may be noted at this point that in vehicular traffic at night, especially along country roadways, considerable apprehension of danger of collision is caused where an approaching car shows but a single headlight. While an observer driving along such a roadway is apprized of the fact that a car is approaching in the opposite direction he has no means of knowing whether the main body of a car lies off to the right or to the left of the approaching light. It is necessary for the observer to drive sufficiently on the right-hand side of the approaching light so as to avoid the possibility of collision in the event the main body of the vehicle lies to the right of the headlight displayed. In doing so, however, he runs the risk of driving his own car off the road with consequent damage to the car and resultant personal injury.

Where the observer proceeds upon the assumption that the main body of the approaching vehicle lies on the left of the oncoming light, he all too frequently finds that his assumption is in error and when within but a few feet of the approaching car is called upon to act speedily to avoid a collision. In many instances, partially because of the glare of the single headlight displayed by the oncoming vehicle and partially because of the darkness then prevailing, the ascertainment of the position of the body of the vehicle comes too late to avoid collision.

A great many operators of automotive vehicles recognize the existence of this situation. In a number of States there are public statutes of record forbidding the operation of automobiles at night unless both headlights are illuminated. Unfortunately, the existence of these statutes on the record books is not sufficient to prevent the operation of such vehicles because of the practical difficulties involved in their enforcement. Many investigators have designed certain devices intended to advise an observer of the position of an approaching vehicle with respect to lights carried by the vehicle. It appears, however, that none of such devices are in use today.

Accordingly, one of the outstanding objects of my invention is the provision of simple, practical, inexpensive and efficient means for advising an observer of the exact position of an oncoming vehicle at night where either of the driving lights or headlights carried by the approaching vehicle is extinguished, all with maximum ease and with minimum danger of collision.

Referring now more particularly to the practice of my invention attention is directed to Figure 1 of the drawing wherein an automobile 10, bearing headlights 10a and 10b is traveling along a roadway generally denoted 11 in a downwardly direction, as seen in the drawing. The course of vehicle 10 is observed by the driver of automobile 12, bearing headlights 12a and 12b, traveling along roadway 11 in an upwardly direction, as seen in the drawing. In accordance with the rules of the road existing in this country vehicle 10 is operating along the left-hand side of the road, as seen in the drawing, while vehicle 12 is moving along the right-hand side of the road.

Now the position of the approaching automobile 10 is readily observed by the driver of automobile 12 under night driving conditions where both of the headlights 10a and 10b of the approaching vehicle are operating properly. Where, for example, the left headlight 10a of the approaching vehicle has become extinguished there is some question as to whether or not the main body of the vehicle 10 lies to the right or to the left of the observed headlight 10b. In accordance with the provisions of my invention there is emitted from headlight 10b a beam of white light generally indicated at 13 and an associated beam of colored light 13a, both coming from a source of light generally indicated at 20a (see Figure 2). In order that the beam of colored light may be readily observed by the operator of vehicle 12 this beam of light is preferably positioned along the extreme outer edge of the beam of white light. Similarly the left headlight 10a emits light coming from a source of light energy generally indicated at 20b (see Figure 2) in the form of a beam of white light 14 and an associated beam of colored light 14a.

In order that the observer in car 12 may receive the visual indication coming from either one or both of headlights 10a and 10b of the approaching vehicle 10 the colored beams 14a and 13a respectively associated with white beams 14 and 13 emitted from these headlights occupy positions on the right of the white beams, as seen by the observer, (see also Figure 2). With this arrangement colored visual indication is received by the operator of car 12 with a minimum of direct glare from the white beams of light thrown by the headlights of the approaching vehicle. Also, with this arrangement there is a minimum of unnecessary illumination of fields away from the observer and the consequent efficiency of roadway illumination.

The colored beams 14a and 13a coming from headlights 10a and 10b are of different colors. Conveniently the beam 13a is red in color, while beam 14a is green.

Similarly the right-hand headlight 12b, as seen by an observer in car 10, sends along the near side of the beam of white light 21 a streak of green light 21a and the left-hand headlight 12a emits a beam of white light 22 bearing a streak of red light 22a along its near side.

The coloring of the auxiliary indicating beams associated with the driving lights or headlights of automotive vehicles necessarily must be the same for all vehicles. Thus, an observer of a single approaching driving light, with an associated beam of red light, is warned that the main body of the vehicle lies off to the left-hand side of this light. Similarly, where the approaching driving light bears an associated green beam the observer knows that the main body of the vehicle lies on the right-hand side of this beam. In either instance the observer may drive the vehicle which he is operating in such a manner as to pass the approaching vehicle 10 without danger of collision or without risk of suddenly having to guide his vehicle off the side of the road.

The colored indicating beams 14a and 13a respectively associated with white beams 14 and 13 emitted from headlights 10a and 10b are conveniently assured to occupy a space along the right-hand edge of the fan-shaped envelopes of light emitted from these headlights by way of the colored sections 15a and 16a (see Figure 2) of the respective headlight lenses or headlight glasses 15 and 16 associated with headlights 10a and 10b. Conveniently the colored sections 15a and 16a comprise segments of lenses 15 and 16. Preferably (see Figure 3) the colored portion 15a of the lens comprises about 5 per cent of the surface of the lens although this may range from say 1 per cent to about 10 per cent. The colored portion of the lens is preferably in the form of a segment since this shape is effective in giving a broad colored streak to the outer edge of the beam of white light passing through the main body of the lens. Certain advantages are achieved however, where (see Figure 4) colored portion 25a of lens 25 is of a circular or oval shape. Likewise, certain advantages are gained (see Figure 5) where a colored portion of 35a of lens 35 is in the form of a sector.

The colored section 15a associated with lens 15 conveniently comprises a section of colored glass made integral with the colored portion of the lens itself. Certain economies in construction are achieved, however, where the colored portion consists of kodeloid or some similar colored transparent material made into the glass lens. Certain other economies are realized (see Figure 6) where a colored sheet of kodeloid, or like material, 17a is mounted on the periphery of lens 17 by suitable fastening devices 17b and 17c. With this construction suitable colored sections may be added to known and used vehicle headlight lenses or glasses at a minimum cost.

Thus it will be seen that there has been provided in this invention a visual indicating means for advising an observer as to the exact location of the main body of an approaching vehicle when either of the two headlights of that vehicle are extinguished. It will be seen that these means are simple, inexpensive in construction and installation and thoroughly reliable and highly practical in operation. It will be seen that my visual indicating means may be readily installed in the headlight assembly of automotive vehicles at a minimum of cost.

While many possible embodiments may be made of my invention and while many changes may be made in the embodiments hereinbefore set forth, it will be understood that all matter described herein, or shown in the accompanying drawing, is to be interpreted as illustrative and not in a limiting sense.

I claim:

In vehicle road illuminating devices of the character described, in combination with a vehicle, a pair of headlights, each provided with a transparent closure having a colored portion along the right-hand periphery thereof, as seen by an observer, amounting to from about 1 per cent to 10 per cent of the area of closure, said portions being of different color for each one of said pair of head-lights whereby main beams of light are sent forth by said head-lights having colored signal streaks along the sides of said beams toward an observer in an approaching vehicle, thus giving visual indication as to the position of the body of the first-mentioned vehicle without blinding the observer with the main light from the head-lights thereof.

VERNON F. TAYLOR.